(12) United States Patent
Calvo

(10) Patent No.: US 9,169,757 B2
(45) Date of Patent: Oct. 27, 2015

(54) EXHAUST SYSTEM WITH MIXING AND/OR EVAPORATING DEVICE

(71) Applicant: Eberspächer Exhaust Technology GmbH & Co. KG, Neunkirchen (DE)

(72) Inventor: Silvia Calvo, Esslingen, DE (US)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 13/969,643

(22) Filed: Aug. 19, 2013

(65) Prior Publication Data

US 2014/0109557 A1    Apr. 24, 2014

(30) Foreign Application Priority Data

Aug. 21, 2012   (DE) .......................... 10 2012 016 423

(51) Int. Cl.

| F01N 1/00 | (2006.01) |
|---|---|
| F01N 3/18 | (2006.01) |
| B01F 5/04 | (2006.01) |
| B01F 5/06 | (2006.01) |
| B01F 3/04 | (2006.01) |
| F01N 3/28 | (2006.01) |
| F01N 3/10 | (2006.01) |
| F01N 3/20 | (2006.01) |
| F01N 13/00 | (2010.01) |

(52) U.S. Cl.
CPC ............. *F01N 3/18* (2013.01); *B01F 3/04049* (2013.01); *B01F 5/0473* (2013.01); *B01F 5/0616* (2013.01); *F01N 3/106* (2013.01); *F01N 3/2892* (2013.01); *B01F 2005/0639* (2013.01); *F01N 3/2066* (2013.01); *F01N 13/009* (2014.06); *F01N 2240/20* (2013.01); *F01N 2610/02* (2013.01)

(58) Field of Classification Search
CPC ....... F01N 3/18; F01N 3/2066; F01N 3/2892; F01N 2240/20; B01F 5/0473; B01F 5/0616; B01F 3/04049; B01F 2005/0639
USPC .................................................... 60/272–324
See application file for complete search history.

(56) References Cited

U.S. PATENT DOCUMENTS

| 4,929,088 | A | 5/1990 | Smith |
| 5,916,134 | A * | 6/1999 | Yang et al. ...................... 60/299 |
| 8,272,777 | B2 * | 9/2012 | Kohrs et al. .................. 366/337 |
| 8,375,708 | B2 * | 2/2013 | Forster et al. ................... 60/324 |
| 8,635,858 | B2 * | 1/2014 | Levin et al. ..................... 60/295 |
| 2007/0245718 | A1 | 10/2007 | Cheng et al. |
| 2009/0262599 | A1 * | 10/2009 | Kohrs et al. .................. 366/337 |
| 2010/0218490 | A1 * | 9/2010 | Forster et al. ................... 60/324 |
| 2010/0293931 | A1 * | 11/2010 | Peters et al. ..................... 60/324 |
| 2011/0146254 | A1 * | 6/2011 | Yi et al. .......................... 60/310 |

* cited by examiner

*Primary Examiner* — Jesse Bogue
(74) *Attorney, Agent, or Firm* — McGlew and Tuttle, P.C.

(57) ABSTRACT

A mixer/evaporator or an exhaust system (5) of an internal combustion engine (1), includes a carrier (20) surrounding, in a circumferential direction, a flat cross section of a mixing/evaporating device (12), through which exhaust gases flow and which extends at a right angle to the axial direction (17). The carrier has opposite side walls, wherein short side walls (23, 24) connect each long side walls (21, 22) to one another. Guide blades (25) project in a direction of the respective opposite long side wall, are set at an angle in relation to the axial direction and are arranged at one of the long side walls at least one axial end (26, 27). An axial end of the first long side walls is offset in the axial direction in relation to the axial end of the second long side wall on the same side of the mixing/evaporating device.

19 Claims, 8 Drawing Sheets

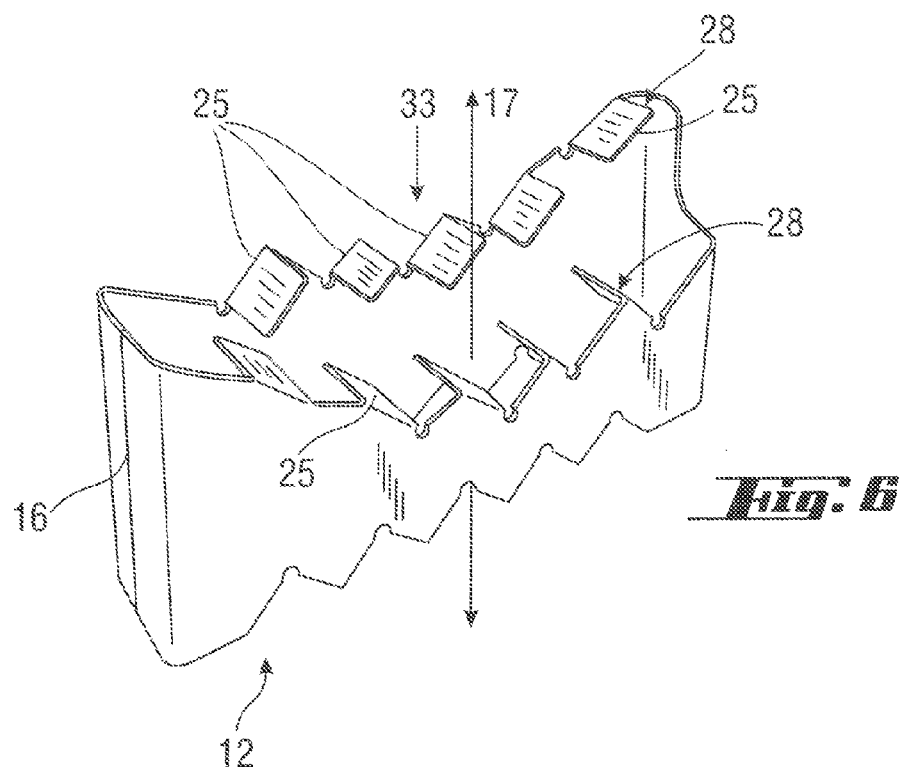
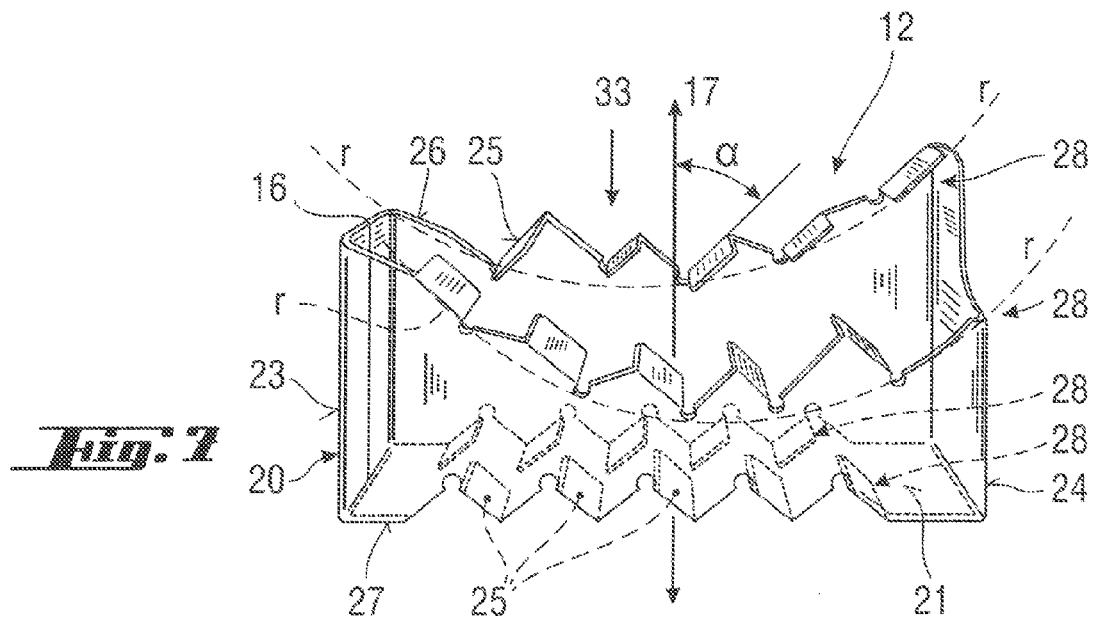

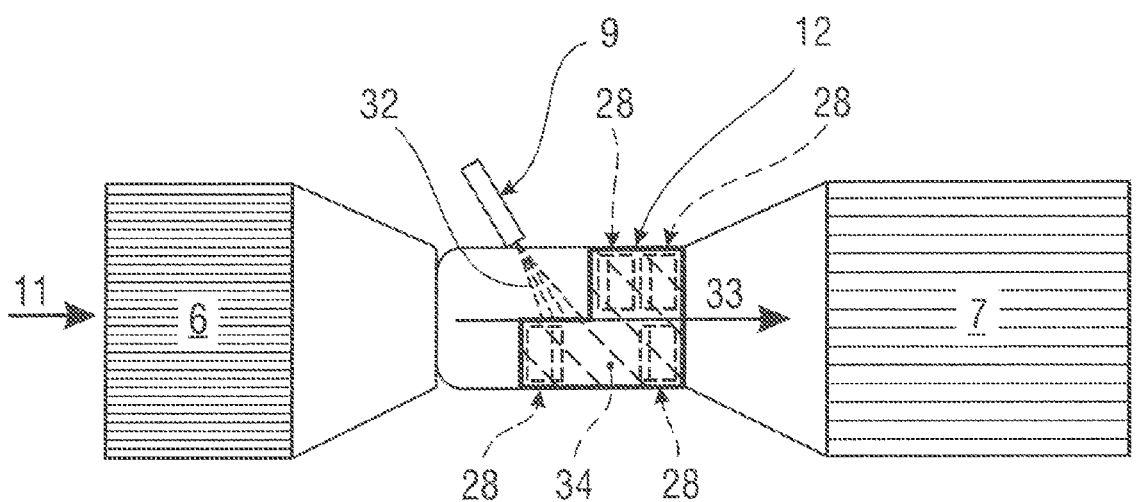

EXHAUST SYSTEM WITH MIXING AND/OR EVAPORATING DEVICE

CROSS REFERENCE TO RELATED APPLICATIONS

This application claims the benefit of priority under 35 U.S.C. §119 of Grerman Patent Application DE 10 2012 016 423.8 filed Aug. 21, 2012, the entire contents of which are incorporated herein by reference.

FIELD OF THE INVENTION

The present invention pertains to a mixing and/or evaporating device for an exhaust system of an internal combustion engine, especially of a motor vehicle. The present invention pertains, in addition, to an exhaust system equipped with such a mixer/evaporator.

BACKGROUND OF THE INVENTION

An exhaust system of an internal combustion engine is usually equipped with means for cleaning and treating the exhaust gases removed from the internal combustion engine. It may be necessary in this connection to introduce a liquid educt into the exhaust gas stream, to evaporate it in same and to mix it with the exhaust gas. It may be necessary, for example, to add a fuel to the exhaust gas upstream of an oxidation catalytic converter in order to bring about an exothermal reaction of the fuel in the oxidation catalytic converter. The heated exhaust gas stream can then be used downstream of the oxidation catalytic converter to heat an additional exhaust gas treatment means, for example, another catalytic converter or a particle filter, to operating temperature or to regeneration temperature. Furthermore, SCR systems are known, which operate with selective catalytic reaction and are equipped with an SCR catalytic converter, which absorbs NOx from the exhaust gas stream.

To make possible the most space-saving design of the exhaust system possible, the oxidation catalytic converter and the SCR catalytic converter may be arranged in parallel next to each other. The outlet-side end of the oxidation catalytic converter and the inlet-side end of the SCR catalytic converter are connected to one another in this case via a part of the exhaust system called a funnel or mixing chamber such that the exhaust gas flow is deflected by 90° each after the oxidation catalytic converter and in front of the SCR catalytic converter.

A suitable reducing agent, for example, ammonia or urea, preferably an aqueous urea solution, is added as an educt to the exhaust gas stream in the area of the mixing chamber upstream of the SCR catalytic converter. The ammonia will then bring about a conversion of the nitrogen oxides present into nitrogen and water in the SCR catalytic converter.

It applies to all educts added in the liquid form to the exhaust gas stream that the desired effect can only be obtained satisfactorily if sufficient evaporation of the educt as well as sufficient mixing of the gaseous educt with the exhaust gas stream can take place between the site at which the liquid educt is introduced and a site at which the educt is consumed. The mixing and/or evaporating means mentioned in the introduction are used for this purpose, which are arranged in the flow path of the exhaust gas between the site at which the educt is introduced and the site at which the educt is consumed. However, only the relatively short mixing chamber between the oxidation catalytic converter and the SCR catalytic converter is available for the evaporation and mixing of the reducing agent in the above-described embodiment of the exhaust system, which makes complete evaporation and mixing of the reducing agent before entry into the SCR catalytic converter difficult.

In addition, the reducing agent is usually added via a nozzle, which introduces the reducing agent as an expanding, conical jet into the exhaust gas stream. Part of the reducing agent is not consequently moving exactly in the direction of flow in the exhaust gas stream, but with a direction component in the direction of the wall of the exhaust system. Since the mixing chamber may have a relatively flat flow cross section, this may cause droplets to hit the wall of the mixing chamber and form a film on the wall before the reducing agent is evaporated. It is very difficult to return the reducing agent from such a film on the wall into the exhaust gas stream and to evaporate and mix it. The formation of a film on the wall is additionally also facilitated by the fact that the reducing agent is introduced into the exhaust gas stream directly behind the oxidation catalytic converter in order to have the longest possible flow path available for evaporation and mixing of the reducing agent. However, as was mentioned above, the exhaust gas flow is deflected by 90° in this area, as a result of which centrifugal forces may additionally develop, which may throw the droplets onto the wall of the mixing chamber.

SUMMARY OF THE INVENTION

An object of the present invention is to provide an improved or at least different embodiment for a mixing and/or evaporating device of the above-mentioned type or for an exhaust system equipped therewith, which embodiment is characterized by a simpler and therefore more inexpensive design. In addition, improved mixing of the educt with the exhaust gas as well as preventing of the formation of a film on the wall shall, furthermore, be achieved.

According to the invention, a mixing and/or evaporating device is provided for an exhaust system of an internal combustion engine, especially of a motor vehicle. The device includes a carrier which surrounds, in the circumferential direction, a flat cross section of the mixer/evaporator, through which cross section flow is possible and which extends at right angles to the axial direction of the mixer/evaporator. The carrier has a first and a second, mutually opposite long side walls and a first and a second, mutually opposite short side walls. The short side walls connect each of the long side walls to one another. A plurality of guide blades, which project in the direction of the respective opposite long side wall and are set at an angle in relation to the axial direction, are arranged at one of the long side walls at at least one axial end. An axial end of the first long side wall is offset in the axial direction by a distance in relation to the axial end of the second long side wall, which latter axial end is arranged on the same side of the mixer/evaporator in the axial direction.

The present invention is based on the general idea of equipping the mixing and/or evaporating means (device) with a carrier, which encloses in the circumferential direction a flat cross section of the mixer/evaporator, through which flow is possible, and extends at a right angle to the axial direction of the mixer/evaporator. Thus, the carrier does not define a round cross section, but an elongated or flat cross section, such that the carrier has two long side walls located opposite each other and two short side walls located opposite each other, wherein the short side walls connect the two long side walls to one another. Due to the design of the carrier as proposed according to the present invention with a flat cross section, it is possible to arrange a plurality of guide blades, which project in the direction of the other long side wall and are set at a pitch angle in relation to the axial direction, next to each other in a row at at least one axial end of a long side wall. The guide blades extend at right angles to the axial direction and are also arranged next to each other at a right angle to the axial direction and also at a right angle to their longitudinal direction due to this mode of construction. The axial direction of the mixer/evaporator extends in parallel to a principal direction of flow of the exhaust gas through the mixer/evaporator. This principal direction of flow does not take into account flow deflections, cross flows, backflows, turbulences and the like within the cross section through which flow is possible. Thus, a row of guide blades, which are arranged next to each other, especially extend in parallel to each other and which each bring about a flow deflection in the direction of a short side wall, is thus made available at an axial end of the respective long side wall. The long side walls extend to different extension the axial direction, as a result of which a stepped arrangement of the axial ends of the long side walls is obtained.

The mixing and/or evaporating device can be very well adapted in this manner to flow processes prevailing in the mixing chamber, as they may occur, for example, due to the 90° deflection. Furthermore, different types of injection of reducing agent can be taken into account with this arrangement.

Corresponding to an especially advantageous embodiment, the incoming flow-side axial end of the second long side wall is offset in relation to incoming flow-side axial end of the first long side wall in the axial direction against the direction of flow, i.e., downstream of the rear-side axial end of the first long side wall.

The different length of the long side walls in the axial direction on the incoming flow side, i.e., the side facing the oxidation catalytic converter, leads to a stepped design of the mixing and/or evaporating device on this side. The incoming flow-side end of the mixing and/or evaporating device can be positioned as a result in relation to the oxidation catalytic converter such that even though a part of the mixing and/or evaporating device is arranged in front of the discharge area at the end of the oxidation catalytic converter, which end points away from the flow, it is located at a spaced location from this in the longitudinal direction of the oxidation catalytic converter. The incoming flow side of the mixing and/or evaporating device can thus be arranged closer to the means for introducing the reducing agent without reducing the flow cross section at the discharge-side end of the oxidation catalytic converter.

Corresponding to another advantageous embodiment, the discharge-side axial end of the second long side wall is offset in relation to the discharge-side axial end of the first long side wall in the axial direction in the direction of flow.

Depending on the manner in which the reducing agent is introduced and depending on the flow conditions, accumulation of the reducing agent may occur at a wall of the mixing chamber facing away from the oxidation catalytic converter and the SCR catalytic converter, i.e., at an outer wall of said mixing chamber, or at a wall of the mixing chamber facing the oxidation catalytic converter and the SCR catalytic converter, i.e., at an inner wall of said mixing chamber. The course of the flow can be influenced at a site located farther downstream at the wall of the mixing chamber located outside by displacing the discharge-side axial end of the second low side wall in the direction of flow, as a result of which mixing of the reducing agent with the exhaust gas stream can be achieved again at the wall located on the outside in the vicinity of the SCR catalytic converter.

According to another advantageous embodiment, the discharge-side axial end of the first long side wall is offset in relation to the discharge-side axial end of the second long side wall in the axial direction in the direction of flow, i.e., it is arranged downstream of the rear axial end of the first long side wall.

The course of the flow at a site located father downstream at the inner wall of the mixing chamber can be influenced by displacing the discharge-side axial end of the first long side wall in the direction of flow. As a result, mixing of the reducing agent with the exhaust gas stream can be achieved again at the inner wall in the vicinity of the SCR catalytic converter.

A plurality of guide blades, which project in the direction of the respective opposite side wall and are set at an angle in relation to the axial direction, are arranged in another advantageous embodiment at the first and/or second long side wall at an incoming flow-side axial end.

In case of a stepped design of the mixing and/or evaporating device on the incoming flow side as described above, this mixing and/or evaporating device can be arranged, as described, partly in front of the discharge opening of the oxidation catalytic converter without narrowing the flow cross section on the discharge side of the oxidation catalytic converter. In case of guide blades arranged on the incoming flow side, this means that a row of guide blades can be arranged closer to the means for introducing the reducing agent without reducing the flow cross section at the discharge-side end of the oxidation catalytic converter. The formation of a film on the wall can thus be prevented and very early size reduction of the droplets of reducing agent into finer droplets can take place. On the whole, the row of guide blades arranged farthest upstream is thus arranged closer to the nozzle of the reducing agent feed means, as a result of which the reducing agent droplets reach the guide blades of the mixing and/or evaporating device before they can reach the wall. In particular, the reducing agent is divided by the guide blades into finer droplets, which can thus follow the course of the flow more easily and can be evaporated better than coarser droplets.

According to another advantageous embodiment, a plurality of guide blades, which project in the direction of the respective opposite long side wall and are set at an angle in relation to the axial direction, are arranged at the first and/or second long side wall.

Intensive mixing and evaporation of reducing agent droplets already divided into finer droplets by the guide blades arranged farther upstream can take place if guide blades are arranged at the discharge-side end of the mixing and/or evaporating device.

In another advantageous embodiment, the guide blades are arranged at a right angle to the axial direction along at least one long side wall at an axial end such that the guide blades located closest to the short side walls have a greater distance in the axial direction from the opposite axial end of this long side wall than the guide blades arranged farther away from the short side walls at a right angle to the axial direction.

On the whole, an approximately concave arrangement of the guide blades along a radius or an approximately concave impingement surface is obtained for reducing agent droplets from the sum of the guide blade surfaces on the incoming flow side due to such an arrangement of the guide blades of a long side wall in relation to one another. On the whole, a larger impingement surface or flow guide surface is thus obtained in the mixing and/or evaporating device at a constant flow cross section.

According to another advantageous embodiment, the guide blades are arranged at a right angle to the axial direction in relation to one another along at least one long side wall such that the guide blades located closer to the short side walls have a shorter distance in the axial direction from the opposite axial end of this long side wall than do the guide blades arranged farther away from the short side walls at a right angle to the axial direction.

Due to such an arrangement of the guide blades of a long side wall in relation to one another, an approximately convex arrangement of the guide blades along a radius or an approximately convex impingement surface is obtained, on the whole, from the sum of the guide blade surfaces on the incoming flow side. On the whole, a larger impingement surface or flow guide surface is thus obtained in the mixing and/or evaporating device at constant flow cross section.

The distance in axial direction from the guide blades at an axial end of the first long side wall to the opposite axial end of the first long side wall is greater in another advantageous embodiment in case of guide blades that are arranged closer to the first short side wall than in case of guide blades that are arranged closer to the second short side wall, and the distance in axial direction from the guide blades at an axial end of the second long side wall to the opposite axial end of the second long side wall is shorter in case of guide blades that are arranged loser to the first short side wall than in case of guide blades that are arranged loser to the second short side wall.

Due to this arrangement, the row of guide blades of the first long side wall extends from the first short side wall linearly or concavely along a radius obliquely in the direction of flow and the row of guide blades of the second long side wall extends from the first short side wall linearly or concavely along a radius obliquely against the direction of flow. Taking the flow conditions in the mixing chamber and the manner in which the reducing agent is introduced into account, the distance of the individual guide blades can be selected as a result to be such that the smallest possible quantity of reducing agent will reach the wall of the mixing chamber and very good mixing of the reducing agent will take place.

According to another advantageous embodiment, the flat cross section, through which flow is possible, has a first width in a first direction extending at a right angle to the axial direction that is greater than a second width in a second direction extending at a right angle to the axial direction and at a right angle to the first direction.

The flat cross section of the mixing and/or evaporating device makes it possible to arrange the guide blades at a right angle to the axial direction in a row next to each other, as a result of which a large-area lateral deflection of the flow in the direction of one of the short side walls is possible. The introduction of the reducing agent into the exhaust gas stream takes place after the flow is discharged from the oxidation catalytic converter, i.e., in an area in which the flow is deflected in the mixing chamber by 90°. Deflection in a direction that is at a right angle thereto, i.e., in the direction of the short side walls, thus make possible a highly effective mixing of the reducing agent with the exhaust gas stream, because deflection of the flow takes place in two directions that are at a right angle to one another.

An exhaust system according to the present invention for an internal combustion engine, especially of a motor vehicle, comprises at least one SCR catalytic converter, a reducing agent feed means, which has at least one injector for feeding a reducing agent to the exhaust gas stream upstream of the SCR catalytic converter, with at least one mixing and/or evaporating device, which is arranged between the at least one injector and the at least one SCR catalytic converter.

It is apparent that the above-mentioned features, which will also be used below, can be used not only in the particular combination indicated, but also other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 shows another perspective view of the embodiment shown in FIG. 4;

FIG. 8A is a sectional view of the exhaust system, which shows an embodiment of the mixing and/or evaporating device;

FIG. 9 is a simplified sectional view in which another embodiment of the exhaust system is shown, in which the oxidation catalytic converter, the mixing chamber and the SCR catalytic converter are arranged linearly in a row.

DESCRIPTION OF THE PREFERRED EMBODIMENTS

Figure 1:
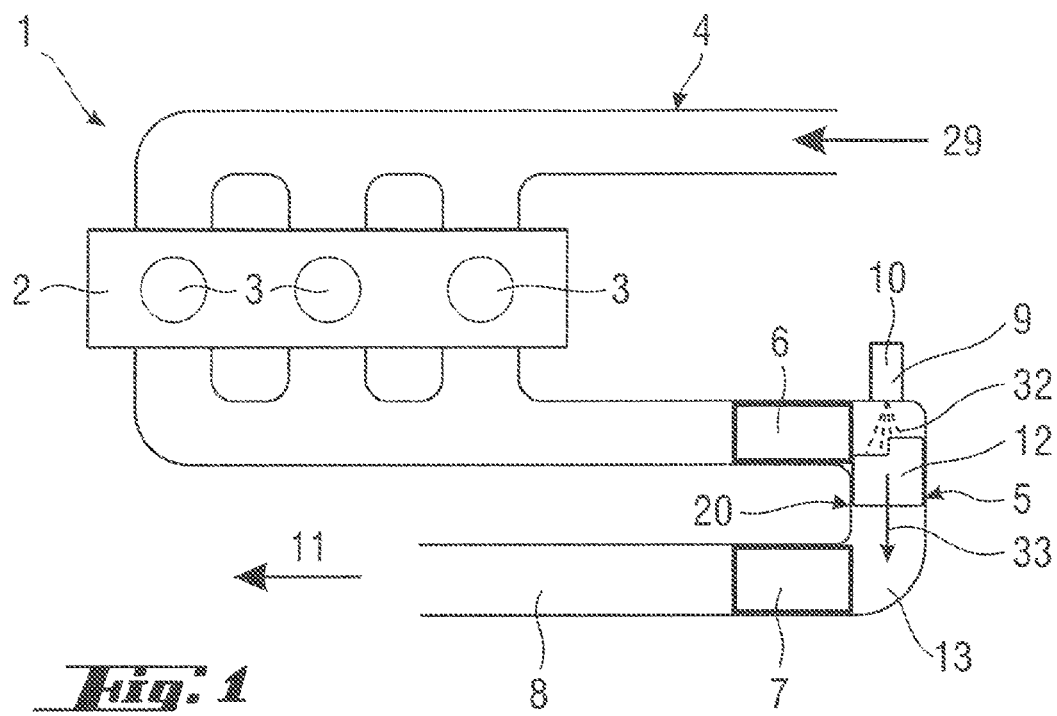
FIG. 1 is a highly simplified, block diagram-like schematic view of an internal combustion engine with an exhaust system.

Referring to the drawings in particular, corresponding to FIG. 1, an internal combustion engine 1 comprises in the usual manner an engine block 2, which has a plurality of cylinders 3. A fresh air feed unit 4 supplies the cylinders 3 of the engine block 2 with fresh air.

A corresponding fresh air stream is indicated by an arrow 29. An exhaust system 5 removes combustion exhaust gases from the cylinders 3 of the engine block 2 during the operation of the internal combustion engine 1. Furthermore, the exhaust system 5 brings about exhaust gas cleaning and exhaust gas treatment.

The exhaust system 5 is equipped for this with at least one diesel oxidation catalytic converter 6 and with an SCR catalytic converter 7, which are integrated into an exhaust gas line 8 of the exhaust system 5. To make a space-saving embodiment possible, a U-shaped arrangement of diesel oxidation catalytic converter 6 and SCR catalytic converter 7 may be provided. The diesel oxidation catalytic converter 6 and the SCR catalytic converter 7 are arranged in this case next to each other such that their longitudinal axes extend in parallel to each other. The flow in the diesel oxidation catalytic converter is opposite to that in the SCR catalytic converter 7. The discharge-side end of the diesel oxidation catalytic converter 6, i.e., the end from which the exhaust gas stream leaves the diesel oxidation catalytic converter 6, and the incoming flow-side end of the SCR catalytic converter 7, i.e., the end into which the exhaust gas stream enters the SCR catalytic converter, are connected to one another via a so-called funnel and a mixing chamber 13. Deflection of the exhaust gas stream after discharge from the diesel oxidation catalytic converter 6 by 90° takes place in this mixing chamber 13 and a repeated deflection of the exhaust gas stream by 90° takes place before it enters the SCR catalytic converter 7.

The SCR catalytic converter 7 may also be designed as a particle filter or diesel particle filter, which is provided with a corresponding coating. The exhaust system 5 comprises, furthermore, a reducing agent feed means 9, which has at least one injector 10 or a tube 10, by means of which a reducing agent can be introduced into an exhaust gas stream 11, which flows in the exhaust gas line 8 during the operation of the internal combustion engine 1 and is indicated by arrow (11). The liquid reducing agent is injected in this case into the exhaust gas stream 11 upstream of the SCR catalytic converter 7.

The exhaust system 5 comprises, furthermore, a mixing and/or evaporating device 12, which will hereinafter be called mixer/evaporator 12 for short. Mixer/evaporator 12 is arranged in the mixing chamber 13 between the injector 9 and the SCR catalytic converter 7, so that the exhaust gas with the reducing agent added must first flow through mixer/evaporator 12 before the mixture can flow into the SCR catalytic converter 7.

Figure 4:
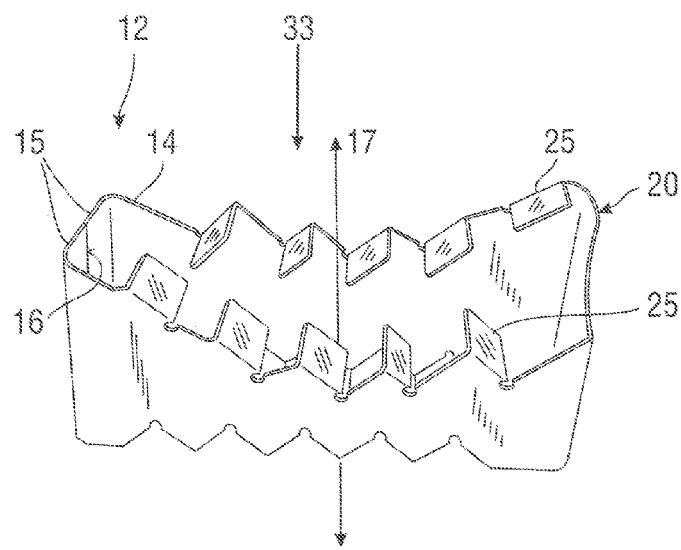
FIG. 4 is a perspective view of another embodiment of the mixing and/or evaporating device.
Figure 5:
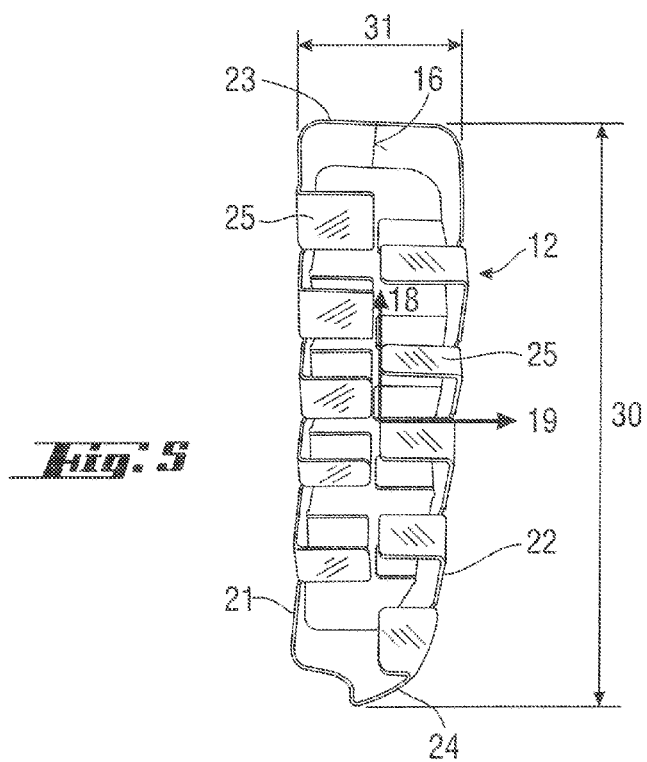
FIG. 5 is a top view of the embodiment shown in FIG. 4.
Figure 6A:
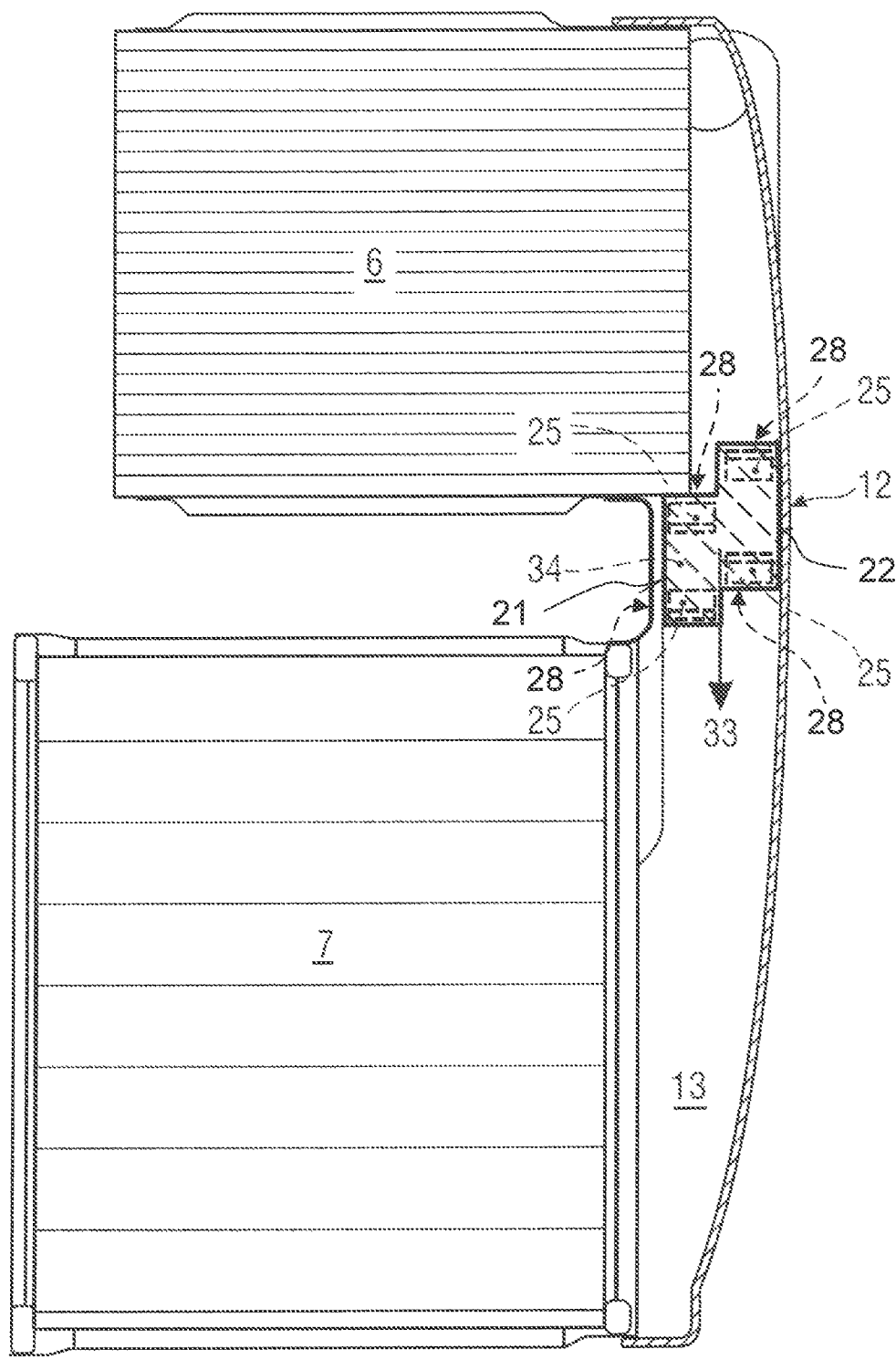
FIG. 6 is another perspective view of the embodiment shown in FIG. 4.

As is shown in FIGS. 4 and 5, mixer/evaporator 12 comprises a sheet metal plate 14, which is made, for example, from ferritic or austenitic steel and whose ends 15 are bent and fitted together at a connection site 16 such that a flat cross section or carrier 20, through which flow is possible, is formed, for example, in the manner of a square tube. The direction of flow 33 through this cross section is parallel to an axial direction 17 of the tube.

A "flat" cross section, through which flow is possible, as was described above, is characterized in that it has a first width 30 or diameter (dimension) in a first direction extending at a right angle to the axial direction 17 that is greater than a second width 31 or a diameter (dimension) in a second direction 19 extending at a right angle to the axial direction 17 and at a right angle to the first direction 18. In particular, the diameter in one of the directions may be at least double that in the other direction. Round cross sections are excluded hereby, while oval and elliptical cross sections are or may likewise be flat. The terms "long" and "short" are defined here as being relative in relation to one another rather than in absolute terms, so that the long side walls in the circumferential direction are longer than the short side walls. Depending on the geometry of the cross section of the means, through which cross section flow is possible, the long side walls are advantageously straight, while the short side walls may be curved.

Since the cross section of mixer/evaporator 12, through which cross section flow is possible, is flat, carrier 20 has two long side walls 21, 22, which are located opposite each other, as well as two short side walls 23, 24, which are likewise located opposite each other. The short side walls 23, 24 each connect the two long side walls 21, 22.

Furthermore, mixer/evaporator 12 is equipped with a plurality of guide blades 25, which project each from one of the long side walls 21, 22 in the direction of the other long side wall 212, 22 and project at an axial end 26 or 27 of mixer/evaporator 12 or of carrier 20 or of the respective long side wall 21, 22. If the exhaust gas flow is oriented corresponding to arrow 33, one axial end, which is the first end to be reached by the flow, forms an incoming flow side 26, which will likewise be designated by 26 below, while the other axial end 27 will form a discharge side 27, which will likewise be designated by 27 below.

The guide blades 25 extend each straight as well as in parallel to one another. Furthermore, the guide blades 25 are planar in the embodiments being shown here. In addition, they are set at an angle in relation to the axial direction 17. A pitch angle of the guide blades 25 in relation to the axial direction is 45° within the framework of usual manufacturing tolerances in the examples being shown.

The guide blades 25 extend at a right angle to the axial direction 17 and are arranged, in addition, next to each other at a right angle to their longitudinal extension and at a right angle to the axial direction 17 in a row, which can also be called a row of blades 28.

Provisions are made in the embodiments according to FIGS. 4-7 for guide blades 25, which project in the direction of the other long side wall 21, 22, to be arranged at both long side walls 21, 22 at at least one axial end 26, 27. As a result, two rows of blades 28, which are arranged next to each other and extend in parallel to one another, are arranged in the embodiments being shown here at the respective axial end 26, 27, i.e., on the incoming flow side 26 and at the discharge side 27. The guide blades 25 located mutually opposite each other are dimensioned here, for example, such that they extend starting from the corresponding long side wall 21, 22 to a central longitudinal plane, which extends centrally between the two long side walls 21, 22. As an alternative, embodiments in which rows of guide blades 28 may be arranged at one long side wall 21 or at one axial end 26 only are conceivable as well.

In another alternative embodiment, the guide blades 25 of the two long side walls 21, 22 may extend in the direction of the other side wall 21, 22 to the extent that the guide blades 25 of one long side wall 21 protrude into the gaps between adjacent guide blades 25 of the other side wall 22, so that a common row of guide blades 28 is ultimately formed, which is formed by the guide blades 25 of the two long side walls 21, 22, with the guide blades 25 of the two long side walls 21, 22 alternating within this common row of guide blades 28.

The guide blades 25 are arranged and dimensioned in the embodiments being shown here such that, located at spaced locations from the respective long side wall 21, 22, from which they start out, they are in a detached manner and have a free end 31. Thus, the guide blades 25 of the embodiments being shown have especially no contact with the respective opposite long side wall 21, 22 and have no contact with the other guide blades 25.

If, as can be recognized in the embodiment according to FIGS. 4-7, guide blades 25 are provided at both axial ends 26, 27, these may be set by an angle α either in the same direction or opposite the axial direction 17. The guide blades 25, which are arranged at the same axial end 26, 27 but at opposite long side walls 21, 22, are set at an angle opposite the axial direction 17 in the embodiments being shown. In other words, the guide blades 25 of one row of blades 28, which is formed at one of the long side walls 21 on the incoming flow side 26 and/or on the discharge side 27, is set at a pitch angle opposite the guide blades 25 of the other row of blades 28, which is formed at the other long side wall 22.

Figure 3:
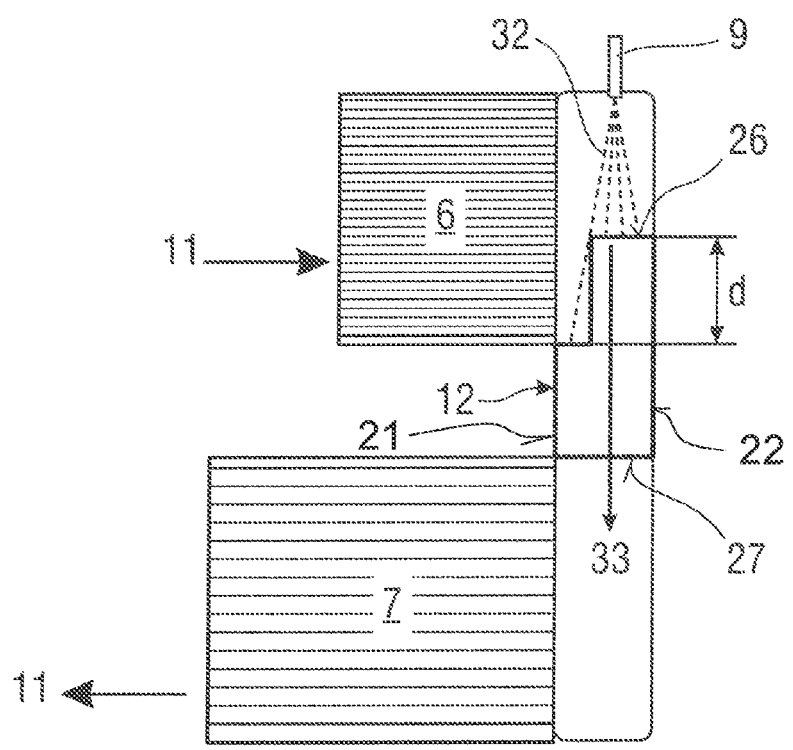
FIG. 3 is a highly simplified sectional view of an oxidation catalytic converter, with an SCR catalytic converter and with a mixing chamber, as well as with an introduction device with a conical jet of reducing agent shown schematically and with a mixing and/or evaporating device.
Figure 2:
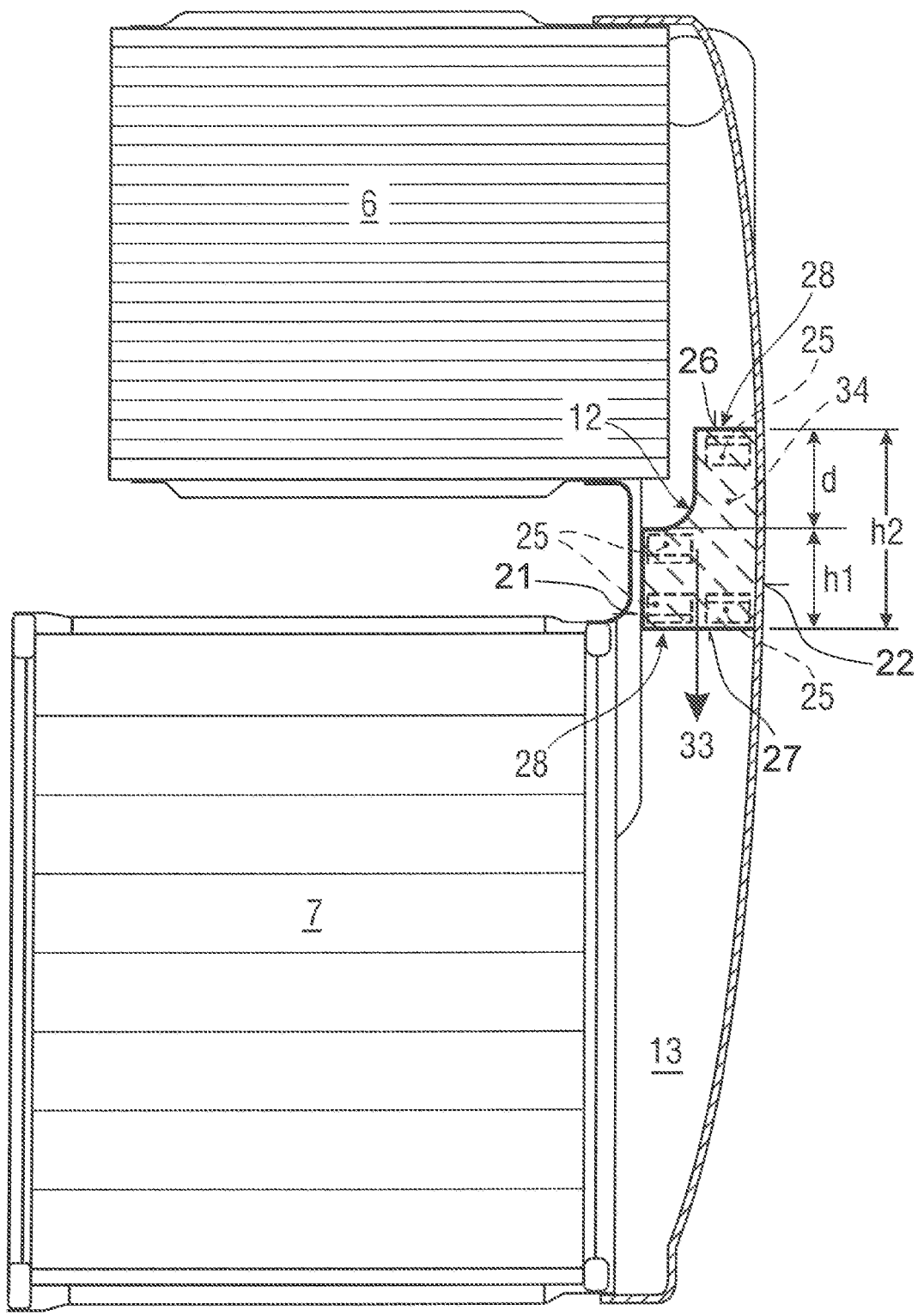
FIG. 2 is a simplified sectional view of an oxidation catalytic converter and with an SCR catalytic converter, which are connected to one another via a mixing chamber, as well as a view of a mixing and/or evaporating device arranged in the mixing chamber.

As can be seen in FIGS. 2 and 3, the side walls 21, 22 do not have all the same height in the axial direction. Thus, a first long side wall 21 extends essentially to a defined height $h_1$ in the axial direction, whereas a second long side wall 22 extends to a greater height $h_2$ in the axial direction compared to the first long side wall. The first long side wall 21 and the second long side wall 22 consequently differ in their heights by a distance d. As is shown, for example, in FIG. 2, a mixing zone 34, in which intensive mixing of the reducing agent with the exhaust gas stream is brought about by the guide blades 25, extends adjacent to) the row of guide blades 28 located farther away upstream.

Since the rows of guide blades 28 are arranged at the axial ends 26, 27, a stepped arrangement of the rows of guide blades 28 in relation to one another is thus obtained especially at the incoming flow-side axial end 26, with the step height corresponding to the distance d. Particles or droplets being entrained with the exhaust gas flow, e.g., injected reducing agent 32, will thus reach the row of guide blades 28 arranged at the second long side wall 22 sooner than the row of guide blades 28 arranged at the first long side wall 21.

The short side walls 23, 24 do not extend in the embodiment shown in FIGS. 4 through 7 to a uniform height in the axial direction, a first short side wall 23 having a uniform height and a second short side wall 24 at the transition to the first long side wall 21 having a smaller height at the transition to the second long side wall 22 in the exemplary embodiment being shown.

Furthermore, the rows of guide blades 28 do not extend in a straight line. The guide blades 25 are not consequently all arranged at the same height in relation to the axial direction 17 but offset in relation to one another in the axial direction 17. More precisely, the guide blades 25 arranged at the incoming flow-side axial ends of each side wall form rows of guide blades 28, which are bent by a radius r and which are each bent about axes extending at a right angle to the axial direction 17 and at a right angle to the long side walls 21, 22. The bend of the rows of guide blades 28 extends concavely in relation to mixer/evaporator 12, i.e., the incoming flow-side guide blades 25 of the respective long side wall 21, 22 are arranged in relation to one another at a right angle to the axial direction such that the guide blades located closest to the short side walls 23, 24 have a greater distance in the axial direction 20 from the opposite, discharge-side axial end 26, 27 of this long side wall than do the guide blades 25 located at a greater distance from the short side walls at a right angle to the axial direction 20. However, bending of the rows of guide blades 28 that extends convexly in relation to the mixer/evaporator 12 would also be conceivable. It is possible due to this arrangement to arrange more guide blades 25 or a larger impingement surface of the guide blades 25 in the exhaust gas stream at constant cross section of the carrier, through which said cross section flow is possible.

Furthermore, the rows of guide blades 28 of the respective long side wall 21, 22 are not arranged next to each other but extend spread out in relation to one another in the manner of scissors. This means that the distance in the axial direction 17 from the guide blades 25 at the incoming flow-side axial end 26 of the first long side wall 21 to the opposite, i.e., discharge-side axial end 27 of the first long side wall 21 is greater in case of guide blades that are arranged closer to the first short side wall 23 than in case of guide blades 25 that are arranged closer to the second short side wall 24. By contrast, the distance in axial direction 17 from the guide blades 25 at the incoming flow-side axial end 26 of the second long side wall 22 to the opposite axial end 27 of the second long side wall 22 is shorter in case of guide blades 25 that are arranged loser to the first short side wall 23 than in case of guide blades 25 that are arranged closer to the second short side wall 24.

Carrier 20 is a shaped sheet metal part, which integrally comprises the four side walls 21, 22, 23, 24, in the exemplary embodiments described. Furthermore, the guide blades 25 are formed integrally at the respective long side wall 21, 22, so that the complete mixer/evaporator 12 is manufactured ultimately from a single shaped sheet metal part. The manufacture may be carried out from an elongated, strip-shaped sheet metal blank, in which the guide blades 25 are cut free at first. The guide blades 25 can subsequently be bent at an angle. Finally, the sheet metal strip can be bent corresponding to the flat cross section of the mixer/evaporator 12, through which flow is possible, in order to form the long and short side walls 21, 22, 23, 24 of the carrier 20. The longitudinal ends of the blank may be fastened to one another at the one short side wall 23 corresponding to a connection seam.

Figure 8B:
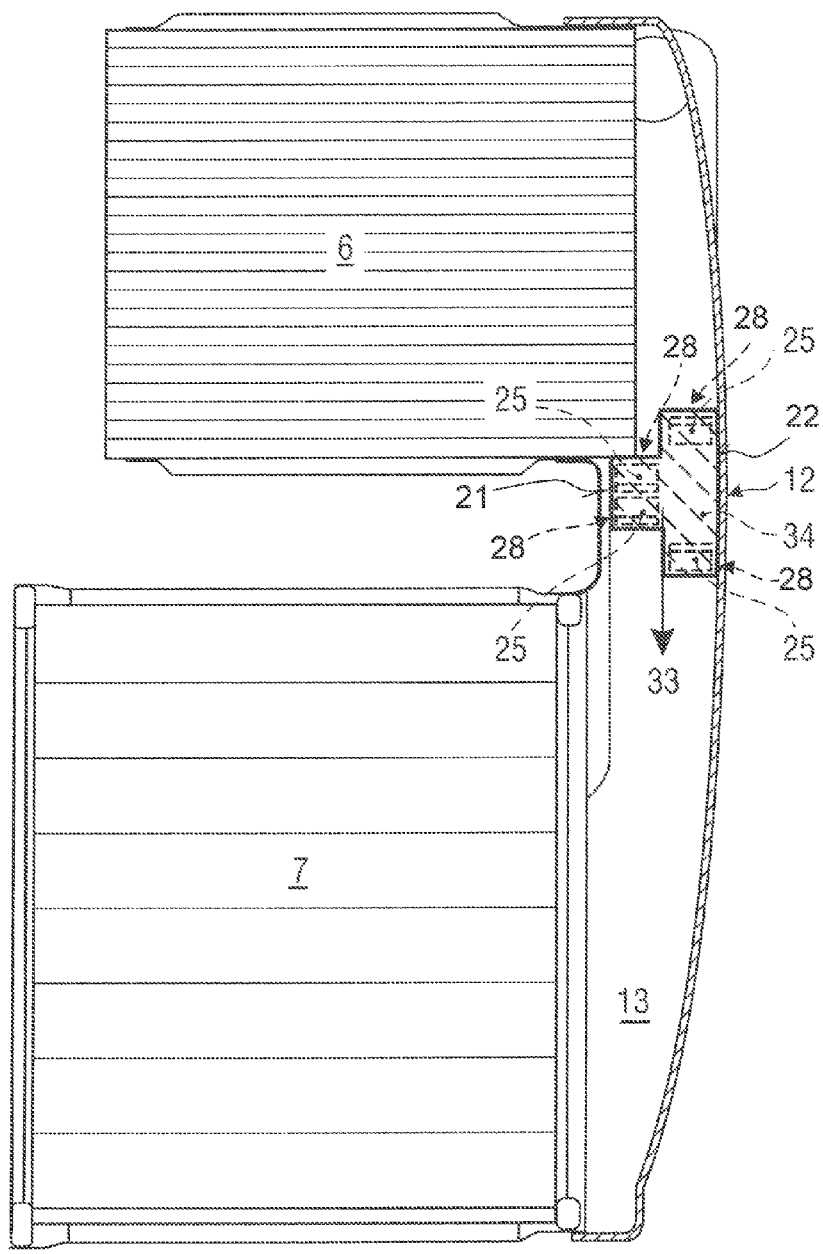
FIG. 8B is a sectional view of the exhaust system, which shows another embodiment of the mixing and/or evaporating device.
Figure 8C:
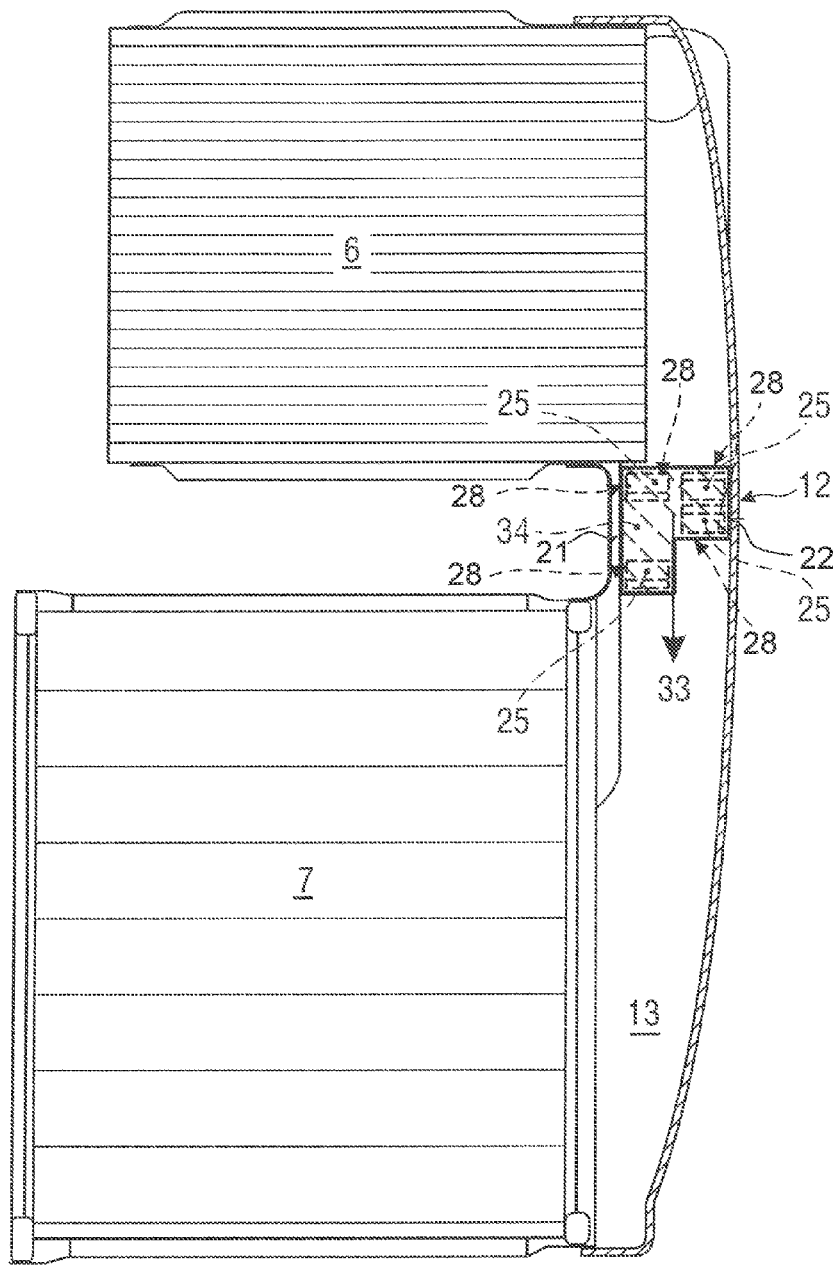
FIG. 8C is a sectional view of the exhaust system, which shows still another embodiment of the mixing and/or evaporating device.

FIGS. 8 A through 8 C schematically show a plurality of further embodiments of mixer/evaporator 12 in the installed state, which differ from each other essentially by the different heights of the long side walls 21, 22. Different types of injection of reducing agent and different flow conditions in the mixing chamber can be taken into account by means of the embodiments described below.

FIG. 8 A shows an embodiment in which the first long side wall 21 extends on the incoming flow side up to the oxidation catalytic converter 6. The second long side wall 22 extends, as in the first embodiment described, farther against the direction of flow on the incoming flow side than does the first long side wall 21, as a result of which the row of guide blades 28 arranged at the second long side wall 22 slightly overlaps in the projection the discharge area of the oxidation catalytic converter 6. However, this row of guide blades 28 is located at a spaced location from the oxidation catalytic converter 6 in the longitudinal direction of the oxidation catalytic converter, so that the flow cross section is not reduced on the discharge side of the oxidation catalytic converter 6. However, the two long side walls 21, 22 do not extend in this embodiment up to the same height in the direction of flow as in the first embodiment. The first long side wall 21 rather extends farther in the direction of flow in this embodiment than the second long side wall 22, as a result of which a stepped arrangement of the rows of guide blades 28 arranged at both long side walls 21, 22 is obtained on the discharge side. The discharge-side row of guide blades 28 arranged at the first long side wall 21 is arranged closer to the SCR catalytic converter 7 in this embodiment than the row of guide blades 28 arranged on the discharge side at the second long side wall 22.

The incoming flow-side axial ends of the long side walls 21, 22 are designed in the embodiment shown in FIG. 8 B as in the embodiment shown in FIG. 8A. However, the second long side wall 22 extends farther in the direction of flow on the discharge side in this embodiment than the first long side wall 21. Thus, a stepped arrangement of the rows of guide blades 28 arranged at the discharge-side axial ends of the long side walls 21, 22 is likewise obtained in this embodiment, and the row of guide blades 28 arranged at the second long side wall 22 on the discharge side is arranged closer to the SCR catalytic converter 7 than the row of guide blades 28 arranged at the first long side wall 21 on the discharge side.

The incoming flow-side axial ends of the long side walls 21, 22 are designed in the embodiment shown in FIG. 8 C, contrary to the embodiments described so far, such that they extend to an equal height in the direction of flow. The two axial ends of the long side walls 21, 22 terminate at the height of the discharge area of the oxidation catalytic converter, as a result of which no stepped arrangement of the rows of guide blades 28 is formed on the incoming flow side. This embodiment is the same as the embodiment shown in FIG. 8 A on the discharge side.

FIG. 9 shows another embodiment, in which the exhaust gas flow is not deflected between the oxidation catalytic converter and the SCR catalytic converter. The oxidation catalytic converter, the mixing chamber and the SCR catalytic converter are arranged, instead, linearly in a row. The reducing agent is thus introduced in a section in which the flow is straight. The reducing agent must correspondingly be introduced at an angle to the direction of flow, i.e., obliquely to this direction. To achieve that the reducing agent will be distributed over a large area over the flow angle, a steeper introduction angle is advantageous. However, if the introduction angle is too steep, there is a risk that reducing agent 32 will reach a wall located opposite the reducing agent feed means 9 and will form a film on the wall. As in the above-described embodiment, mixer/evaporator 12 is designed such that the rows of guide blades 28 are offset in relation to one another in the axial direction 33. The row of guide blades 28 arranged farther upstream can thus be arranged such that it is located opposite the reducing agent feed means 9. Reducing agent 32 that would reach the wall of the mixing chamber in case of an excessively steep introduction angle will thus reach the upstream row of guide blades 28 and is fed into the exhaust gas stream.

Even though certain elements, embodiments and applications of the present invention have been shown and described, it is obvious that the present invention is not limited to these and the person skilled in the art can make modifications without departing from the scope of validity of the present disclosure, especially regarding the above teaching.

While specific embodiments of the invention have been shown and described in detail to illustrate the application of the principles of the invention, it will be understood that the invention may be embodied otherwise without departing from such principles.

What is claimed is:

1. A device for an exhaust system of an internal combustion engine of a motor vehicle, the device comprising:
   a carrier which surrounds, in a circumferential direction, a flat cross section of the device, through which cross section exhaust gases flow, the cross section extending at a right angle to an axial direction of the device, said axial direction being parallel to a direction of the exhaust gases flow, the carrier comprising:
   a first long side wall;
   a second long side wall, the first long side wall and the second long side wall being mutually opposite long side walls;
   a first short side wall;
   a second short side wall, the first short side wall and the second short side wall being mutually opposite short side walls, wherein the short side walls connect each of the long side walls to one another; and
   a plurality of guide blades, which project in a direction of a respective opposite long side wall and are set at an angle in relation to the axial direction, arranged at one of the long side walls at at least one axial end thereof, wherein an axial end of the first long side wall is offset in the axial direction by a distance in relation to an axial end of the second long side wall and the axial end of the second long side wall is arranged on the same side of the device in the axial direction as the axial end of the first long side wall, wherein an incoming flow-side axial end of the second long side wall is offset by the distance against the direction of flow in the axial direction in relation to an incoming flow-side axial end of the first long side wall, said one of the long side walls extending between said first short side wall and said second short side wall, each of said plurality guide blades being connected to said axial end at a position along a length of said axial end, each of said plurality guide blades being located at a spaced location from another one of said plurality of guide blades.

2. A device for an exhaust system in accordance with claim 1, wherein the guide blades are arranged in relation to one another at a right angle to the axial direction along at least one long side wall at an axial end such that the guide blades located closest to the short side walls have a greater distance in the axial direction from the opposite axial end of the at least one long side wall than do the guide blades arranged at a greater distance from the short side walls at a right angle to the axial direction.

3. A device for an exhaust system in accordance with claim 2, wherein a discharge-side axial end of the second long side wall is offset by the distance in the axial direction in relation to a discharge-side axial end of the first long side wall, said plurality of guide blades being integrally connected to said at least one axial end of said one of the long side walls, wherein said plurality of guide blades extend directly from said at least one axial end of said one of the long side walls, said first long side wall and said second side long wall being planar side long walls.

4. A device for an exhaust system in accordance with claim 2, wherein a discharge-side axial end of the first long side wall is offset by a distance in the direction of flow in relation to a discharge-side axial end of the second long side wall in the axial direction.

5. A device for an exhaust system in accordance with claim 2, wherein the plurality of guide blades, which project in the direction of the respective opposite long side wall and are set to an angle in relation to the axial direction, are arranged at the first and/or second long side wall at an incoming flow-side axial end.

6. A device for an exhaust system in accordance with claim 2, wherein the plurality of guide blades, which project in the direction of the respective opposite long side wall and are set at an angle in relation to the axial direction, are arranged at the first and/or second long side wall at a discharge-side axial end.

7. A device for an exhaust system in accordance with claim 1, wherein the guide blades are arranged, in relation to one another, at a right angle to the axial direction along at least one long side wall at an axial end such that the guide blades located closest to the short side walls have a greater distance in the axial direction from the opposite axial end of the at least one long side wall than do the guide blades arranged at a greater distance from the short side walls at a right angle to the axial direction.

8. A device for an exhaust system in accordance with claim 2, wherein:
   a distance in the axial direction from the guide blades at an axial end of the first long side wall to an opposite axial end of the first long side wall is greater in case of guide blades arranged closer to the first short side wall than in case of guide blades arranged closer to the second short side wall; and
   a distance in the axial direction from the guide blades at an axial end of the second long side wall to the opposite axial end of the second long side wall is shorter in case of guide blades arranged closer to the first short side wall than in case of guide blades arranged loser to the second short side wall.

9. A device for an exhaust system in accordance with claim 2, wherein the flat cross section, through which exhaust gasses flow, has a first width in a first direction extending at a right angle to the axial direction that is greater than a second width in a second direction extending at a right angle to the axial direction and at a right angle to the first direction.

10. An exhaust system for an internal combustion engine of a motor vehicle, the exhaust system comprising:
an SCR catalytic converter;
a reducing agent feed means, which has at least one injector, for feeding a reducing agent to the exhaust gas stream upstream of the SCR catalytic converter; and
a device arranged between the at least one injector and the SCR catalytic converter, the device comprising a carrier which surrounds, in a circumferential direction, a flat cross section of the device, through which cross section exhaust gases flow, the cross section extending at a right angle to an axial direction of the device, said axial direction being parallel to a direction of the exhaust gases flow, the carrier comprising:
a first long side wall;
a second long side wall, the first long side wall and the second long side wall being mutually opposite long side walls;
a first short side wall;
a second short side wall, the first short side wall and the second short side wall being mutually opposite short side walls, wherein the short side walls connect each of the long side walls to one another; and
a plurality of guide blades, which project in a direction of a respective opposite long side wall and are set at an angle in relation to the axial direction, arranged at one of the long side walls at at least one axial end thereof, wherein an axial end of the first long side wall is offset in the axial direction by a distance in relation to an axial end of the second long side wall and the axial end of the second long side wall is arranged on the same side of the device in the axial direction, as the axial end of the first long side wall, wherein an incoming flow-side axial end of the second long side wall is offset by the distance against the direction of flow in the axial direction in relation to an incoming flow-side axial end of the first long side wall, said one of the long side walls extending between said first short side wall and said second short side wall, each of said plurality guide blades being connected to said axial end at a position along a length of said axial end, each of said plurality guide blades being located at a spaced location from another one of said plurality of guide blades.

11. An exhaust system in accordance with claim 10, wherein the guide blades are arranged, in relation to one another, along a direction that is at a right angle to the axial direction and guide blades located closest to the short side walls have a greater distance in the axial direction from the opposite axial end than guide blades arranged at a greater distance from the short side walls.

12. An exhaust system in accordance with claim 11, wherein the same side of the device is a discharge-side axial end, said plurality of guide blades being integrally connected to said at least one axial end of said one of the long side walls, said long side walls being flat long side walls.

13. An exhaust system in accordance with claim 11, wherein the same side of the device is an incoming flow-side axial end, said axial end comprising an axial edge portion, each of said plurality guide blades being integrally connected to said axial end at a position along a length of said axial edge portion, wherein each of said plurality of guide blades extend directly from said axial end, each of said plurality guide blades being located at a spaced location from another one of said plurality of guide blades.

14. An exhaust system in accordance with claim 10, wherein:
a distance in the axial direction from the guide blades at an axial end of the first long side wall to an opposite axial end of the first long side wall is greater in case of guide blades arranged closer to the first short side wall than in case of guide blades arranged closer to the second short side wall; and
a distance in the axial direction from the guide blades at an axial end of the second long side wall to the opposite axial end of the second long side wall is shorter in case of guide blades arranged closer to the first short side wall than in case of guide blades arranged closer to the second short side wall.

15. A device for an exhaust system of an internal combustion engine, the device comprising:
a carrier which surrounds, in a circumferential direction, a flat device cross section having a first long side dimension, in a first direction, extending at a right angle to the axial direction, that is greater than a second short side dimension in a second direction at a right angle to the axial direction, exhaust gases flowing through the cross section during operation, the cross section extending at a right angle to an axial direction of the device, said axial direction being parallel to a direction of a flow of the exhaust gases, the carrier comprising:
a first long side wall;
a second long side wall, the first long side wall and the second long side wall being mutually opposite long side walls;
a first short side wall;
a second short side wall, the first short side wall and the second short side wall being mutually opposite short side walls, wherein the first short side wall connects the first long side wall to the second long side wall and the second short side wall connects the first long side wall to the second long side wall; and
a plurality of guide blades, each guide blade extending from at least one axial end of at least one of the first long side wall and the second long side wall and being set at an angle in relation to the axial direction, wherein an axial end of the first long side wall is offset in the axial direction by a distance in relation to an axial end of the second long side wall on a same side of the device, wherein an incoming flow-side axial end of the second long side wall is offset by the distance against the direction of flow in the axial direction in relation to an incoming flow-side axial end of the first long side wall, said one of the long side walls extending between said first short side wall and said second short side wall, each of said plurality guide blades being connected to said axial end at a position along a length of said axial end, each of said plurality guide blades being located at a spaced location from another one of said plurality of guide blades.

16. A device for an exhaust system in accordance with claim 15, wherein the guide blades are arranged, in relation to one another, along a direction that is at a right angle to the axial direction and guide blades located closest to the short side walls have a greater distance in the axial direction from the opposite axial end than guide blades arranged at a greater distance from the short side walls.

17. A device for an exhaust system in accordance with claim 16, wherein the same side of the device is a discharge-side axial end, each of said plurality guide blades being integrally connected to said axial end at a position along a length of said axial end, wherein each of said plurality of guide blades extends directly from said axial end, each of said plurality guide blades being located at a spaced location from another one of said plurality of guide blades, each of said first long side wall and said second long side wall being a planar long side wall.

18. A device for an exhaust system in accordance with claim 16, wherein the same side of mixing and/or evaporating device is an incoming flow-side axial end, said plurality of guide blades being integrally connected to said at least one axial end of said one of the long side walls.

19. A device for an exhaust system in accordance with claim 15, wherein:
- a distance in the axial direction from the guide blades at an axial end of the first long side wall to an opposite axial end of the first long side wall is greater in case of guide blades arranged closer to the first short side wall than in case of guide blades arranged closer to the second short side wall; and
- a distance in the axial direction from the guide blades at an axial end of the second long side wall to the opposite axial end of the second long side wall is shorter in case of guide blades arranged closer to the first short side wall than in case of guide blades arranged loser to the second short side wall.

\* \* \* \* \*